(12) United States Patent
Freter et al.

(10) Patent No.: US 9,739,403 B2
(45) Date of Patent: Aug. 22, 2017

(54) COUPLING DEVICE

(71) Applicant: A. KAYSER AUTOMOTIVE SYSTEMS GMBH, Einbeck (DE)

(72) Inventors: Heiko Freter, Einbeck (DE); Claus-Frieder Busche, Kreiensen (DE)

(73) Assignee: A. Kayser Automotive Systems GmbH, Einbeck (DE)

( * ) Notice: Subject to any disclaimer, the term of this patent is extended or adjusted under 35 U.S.C. 154(b) by 9 days.

(21) Appl. No.: 15/041,303

(22) Filed: Feb. 11, 2016

(65) Prior Publication Data
US 2016/0281894 A1    Sep. 29, 2016

(30) Foreign Application Priority Data

Mar. 23, 2015 (DE) .................. 10 2015 003 792

(51) Int. Cl.
*F16L 37/091* (2006.01)
*F16L 37/084* (2006.01)

(52) U.S. Cl.
CPC ......... *F16L 37/0841* (2013.01); *F16L 37/091* (2013.01)

(58) Field of Classification Search
CPC .................... F16L 37/0841; F16L 37/091
USPC ................. 285/305, 319, 321, 322
See application file for complete search history.

(56) References Cited

U.S. PATENT DOCUMENTS

| 5,374,088 | A | * | 12/1994 | Moretti | F16L 37/0841 285/305 |
| 5,405,175 | A | * | 4/1995 | Bonnah, II | F16L 37/144 285/305 |
| 5,520,420 | A | * | 5/1996 | Moretti | F16L 37/00 285/305 |
| 5,683,117 | A | * | 11/1997 | Corbett | F16L 37/088 285/305 |
| 5,813,705 | A | * | 9/1998 | Dole | F16L 37/0987 285/305 |
| 6,053,427 | A | * | 4/2000 | Wilger | B05B 15/069 285/305 |
| 6,318,764 | B1 | * | 11/2001 | Trede | F16L 37/0841 285/305 |
| 6,652,007 | B1 | * | 11/2003 | Hwang | F16L 37/0841 285/305 |
| 7,455,327 | B2 | | 11/2008 | Lorenz | |

(Continued)

FOREIGN PATENT DOCUMENTS

DE    3940114 A1    6/1991
DE    20300666 U1    4/2003

(Continued)

*Primary Examiner* — David E Bochna
(74) *Attorney, Agent, or Firm* — Richard M. Goldberg

(57) ABSTRACT

A coupling device (1; 1') for conduits conveying hydrocarbon liquids and hydrocarbon vapors, in particular for crankcase ventilation conduits, fuel conduits or tank ventilation conduits, includes a coupling body (2) with a connecting piece receiving section (6); and a locking member (4; 4') for locking into place a connecting piece (24) guided into the connecting piece receiving section (6); wherein the connecting piece receiving section (6) has an installation recess (10) open radially toward the side, and wherein the locking member (4; 4') can be guided into the connecting piece receiving section (6) laterally in radial direction (MR) by an installation recess (10).

8 Claims, 8 Drawing Sheets

(56) References Cited

U.S. PATENT DOCUMENTS

| | | | | |
|---|---|---|---|---|
| 8,113,549 B2* | 2/2012 | Bokuhn | ............... | F16L 37/144 285/305 |
| 8,297,659 B2* | 10/2012 | Callahan | ............... | F16L 37/144 285/305 |
| 8,764,067 B2* | 7/2014 | Bundy | ............... | F16L 37/088 285/305 |
| 9,016,729 B2* | 4/2015 | Ishida | ............... | F16L 37/088 285/319 |
| 2007/0246936 A1* | 10/2007 | Jeltsch | ............... | F16L 25/0045 285/305 |
| 2008/0111372 A1* | 5/2008 | Trede | ............... | F16L 37/144 285/305 |
| 2009/0160185 A1* | 6/2009 | Learmont | ............... | F16L 37/144 285/305 |
| 2010/0276924 A1* | 11/2010 | Gillet | ............... | F16L 37/088 285/93 |
| 2011/0089684 A1* | 4/2011 | Schutte | ............... | F16L 37/0915 285/305 |
| 2011/0127766 A1* | 6/2011 | Tsurumi | ............... | F16L 37/144 285/305 |

FOREIGN PATENT DOCUMENTS

| | | | | |
|---|---|---|---|---|
| DE | 102004062207 B3 | 10/2005 | | |
| DE | 102013001389 A1 | 7/2014 | | |
| JP | WO 2016103954 A1 * | 6/2016 | ............ | F16L 37/091 |
| WO | 2007/070994 A1 | 6/2007 | | |
| ZA | WO 2009108963 A2 * | 9/2009 | ............ | F16L 37/091 |

* cited by examiner

B-B

A-A

A-A

B-B

COUPLING DEVICE

BACKGROUND OF THE INVENTION

The present invention relates to a coupling device for conduits conveying hydrocarbon liquids and hydrocarbon vapors, particularly crankcase ventilation conduits, fuel conduits or tank ventilation conduits.

Such coupling devices are used in vehicle construction for example and serve to produce a connection between a pipe-shaped insert component provided with a circumferential locking projection and a sleeve-like coupling body. The insert component can be manufactured out of plastic or metal and be the end of a conduit or the connecting piece on a housing. The coupling body is usually made out of plastic and installed on a conduit, but can also be part of a housing.

Coupling devices of this type are characterized by an effective locking mechanism between coupling body and the insert component and are intended to constitute a sealing connection between the respective conduit members to be coupled. They have become known in many forms, wherein particular attention has been paid to functional reliability and characteristics of their manageability in terms of installation.

DE 10 2013 001 389 A1 discloses a crankcase ventilation for an internal combustion engine with a ventilation conduit which connects the crankcase of the internal combustion engine to a suction tract of the internal combustion engine, wherein the ventilation conduit has the following: a first pipe connecting piece; and a second pipe connecting piece with a receiving space into which the first pipe connecting piece, or respectively an end on the guiding-in side thereof, can be guided; wherein a second groove is formed in the receiving space, and the first pipe connecting piece has a first groove, wherein a compressible sealing ring is inserted into the first groove, which can be engaged with the second groove during the guiding of the first pipe connecting piece into the receiving space, or an extendable or respectively expandable sealing ring is inserted into the second groove, which can be engaged with the first groove during the guiding of the first pipe connecting piece into the receiving space.

In the configuration according to DE 10 2013 001 389 A1 the formation of the second groove in the receiving space of the second pipe connecting piece is very complex since this groove constitutes an undercut. During the manufacture of the second groove in the injection molding process, a complex multi-component tool is necessary for its formation.

SUMMARY OF THE INVENTION

Therefore the object of the present invention is to provide a coupling device which enables a secure, locking connection to a connecting piece, which is nonetheless easy to manufacture and install.

According to one aspect of the present invention a coupling device for conduits conveying hydrocarbon liquids and hydrocarbon vapors, in particular for crankcase ventilation conduits, fuel conduits or tank ventilation conduits, is provided, having: a coupling body with a connecting piece receiving section; and a locking member for locking into place a connecting piece guided into the connecting piece receiving section; wherein the connecting piece receiving section has an installation recess open radially toward the side, and wherein the locking member can be guided into the connecting piece receiving section laterally in a radial direction by means of the installation recess.

The coupling body can be made out of plastic, in particular in an injection molding process. The coupling body can be installed on a conduit conveying hydrocarbon liquids and hydrocarbon vapors, in particular on a crankcase ventilation conduit, fuel conduit or tank ventilation conduit, or be part of such a conduit. However, the coupling body can also be part of a housing. The hydrocarbon liquids or hydrocarbon vapors, which are conveyed in the coupling body, or respectively in the conduits, can, in particular, be fuels.

The connecting piece can be made out of plastic or metal and be the end of a conduit conveying hydrocarbon liquids and hydrocarbon vapors, in particular of a crankcase ventilation conduit, fuel conduit or tank ventilation conduit. However, the connecting piece can also be a crankcase ventilation connecting piece of a crankcase, a fuel connecting piece of a fuel tank or a tank ventilation connecting piece of a fuel tank. The connecting piece does not constitute a part of the claimed coupling device.

The coupling body can have a conduit receiving section on an end opposite the connecting piece receiving section. The conduit receiving section can be formed like a spout or respectively like a nipple, or also like a sleeve. The coupling body can be formed straight, meaning that the longitudinal axis of the connecting piece receiving section and the longitudinal axis of the conduit receiving section can match. In other words, the longitudinal axis of the connecting piece guided-in in the connecting piece receiving section can match the longitudinal axis of the conduit installed on the conduit receiving section. However, the coupling body can also be formed curved or L-shaped, so that the longitudinal axis of the connecting piece receiving section and the longitudinal axis of the conduit receiving section are aligned with each other at an angle not equal to 0°, for example about 90°. The axial direction of the coupling body can therefore be alterable along the length of the coupling body.

In the area of the connecting piece receiving section or respectively of the conduit receiving section, the outer surface and/or the inner surface of the coupling body in the cross section transverse to the axial direction of the coupling body can be substantially formed in the shape of a circle, at least in sections. Hence the coupling body can substantially have the shape of a straight or curved pipe. However, inner and/or outer diameters of the coupling body can be alterable along the axial direction.

The connecting piece receiving section of the coupling body is preferably formed like a sleeve, in order to receive the connecting piece in the inside of the connecting piece receiving section. In other words, the coupling body can be radially extended in the area of the connecting piece receiving section. The coupling body, or respectively the connecting piece receiving section has a connecting piece receiving space in the inside. The connecting piece receiving section constitutes a longitudinal section of the coupling body at an axial end of the coupling body. The connecting piece receiving section has a connecting piece receiving opening opened in axial direction, through which the connecting piece can be guided into the connecting piece receiving section or respectively into the connecting piece receiving space. The guiding-in direction of the connecting piece corresponds to the axial direction of the connecting piece receiving section.

The locking member can be made out of plastic or out of metal and serves to lock into place or respectively fasten the connecting piece in the connecting piece receiving section. The connecting piece is prevented from being pulled out of the connecting piece receiving section by being positively connected by means of the locking member. The locking member is preferably formed as one piece and constitutes a separate component relative to the coupling body.

The locking member is guided into the connecting piece receiving section by means of the installation recess open radially toward the side. The installation recess is connected to the interior space of the connecting piece receiving section or respectively to the connecting piece receiving space. In the completely guided-in state, hence in the installation end position of the locking member, the locking member is, at least in part, arranged inside the connecting piece receiving section or respectively in the connecting piece receiving space. The locking member is preferably installed before the connecting piece is guided into the connecting piece receiving section, so that, during the guiding-in, the connecting piece is also guided through an area of the locking member, through which a connecting piece passes.

The axial length extension of the installation recess roughly corresponds to the axial length extension of the locking member. Similarly, the width of the installation recess roughly corresponds to the width of the locking member, wherein width refers to the extension in a direction transverse to the axial direction and to the installation direction of the locking member. The installation direction of the locking member describes the guiding-in direction of the locking member during installation. The installation direction of the locking member and the guiding-in direction of the connecting piece preferably cross at a right angle. During installation, the locking member is guided into the installation recess from the side, and guided into the inside of the connecting piece receiving section in a direction transverse to the axial direction of the connecting piece receiving section, hence in radial direction, by means of the installation recess. The locking member can only be guided into and installed in the connecting piece receiving section laterally by means of the installation recess.

The width of the installation recess or respectively of the locking member can be substantially constant in installation direction of the locking member. The installation recess can extend substantially over the whole width of the connecting piece receiving section, so that the width of the locking member roughly corresponds to the width of the of the connecting piece receiving section. The installation recess can, for example, extend along a section of the circumference of the connecting piece receiving section from about 120° up to about 180°, preferably about 150° up to about 175°. The opening direction of the installation recess is not restricted in radial direction and can be configured according to accessibility in vehicle construction.

The configuration according to the present invention enables to provide in an advantageous manner a lockable coupling device without undercuts, since a lateral guiding-in of the locking member is possible. This enables manufacture in the injection molding process without the use of a multi-component tool. Further, the installation of the locking member is easier than, for example, the installation of a securing ring in a groove.

The locking member preferably has at least one elastically displaceable locking latch directed radially inward, which can be engaged with a locking projection of the connecting piece guided into the connecting piece receiving section.

The locking latch preferably extends diagonally radially inward, i.e. the locking latch also extends, at least in sections, in axial direction. In the installed state of the locking member, the locking latch preferably extends in axial direction away from the connecting piece receiving opening, which facilitates the guiding-in of the connecting piece and enhances the locking effect. The locking latch can, for example, extend at an angle of about 20° up to about 60°, preferably at an angle of about 45°, relative to the longitudinal axis of the connecting piece receiving section. The locking latch is arranged in the area of the locking member, through which the connecting piece passes.

During the guiding-in of the connecting piece, the locking latch is first elastically displaced or respectively deformed by means of the locking projection, and resets itself again elastically after passing the locking projection. During an attempt to pull the connecting piece out of the coupling device, the locking latch engages with the locking projection, whereby a pulling out of the connecting piece is prevented. More precisely, the free end of the locking latch abuts an axial abutting face of the locking projection, wherein this axial abutting face of the locking latch points counter to the guiding-in direction. The locking latch can be formed like a spring tongue. The locking projection is preferably formed substantially circumferential on the outer surface of the connecting piece. The locking projection can also be described as a "band" of the connecting piece.

The locking member preferably has a plurality of locking latches which are formed along the area, through which the connecting piece passes. The locking latches are preferably arranged such that they are adapted to substantially fit the outer contour of the connecting piece, at least in sections. The locking member can have 3, 5, 10 or 20 locking latches for example.

The locking member is preferably formed substantially ring-shaped, wherein the connecting piece guided into the connecting piece receiving section can be unreleaseably locked in the connecting piece receiving section by means of the locking member.

With a substantially ring-shaped locking member, the locking member can no longer be pulled out of the connecting piece receiving section after the guiding of the connecting piece into the connecting piece receiving section and through the locking member due to the shape of the locking member. On the other hand, the connecting piece is locked into place or respectively fastened in the connecting piece receiving section by means of the locking member. Therefore the connecting piece guided into the connecting piece receiving section is unreleaseably locked into place or respectively fastened in the connecting piece receiving section or respectively in the coupling device.

A plurality of elastically deformable locking latches directed radially inward are preferably formed along the ring-shaped inner circumference of the locking member.

With a ring-shaped locking member, the area through which the connecting piece passes is the ring-shaped inner circumference of the locking member.

The locking member is preferably formed substantially U-shaped, wherein the connecting piece guided into the connecting piece receiving section can be releaseably locked into place in the connecting piece receiving section.

With a locking member formed U-shaped or respectively horseshoe-shaped, this can be guided into the installation recess with the open end in front. Due to the U-shaped formation only the rear curved section of the locking member can come into contact with the connecting piece. Therefore, even after the connecting piece has been guided into the connecting piece receiving area, the locking member can be pulled laterally out of the connecting piece receiving area. Hence the locking into place of the connecting piece by means of the locking member is releaseable.

A plurality of elastically deformable locking latches directed radially inward are preferably formed along the inner circumference of the semi-circular, curved section of the locking member.

In particular, the locking latches can be formed only along the inner circumference of the semi-circular, curved section of the locking member.

The connecting piece receiving section preferably has an unlocking recess which enables a levering out of the locking member installed in the connecting piece receiving section, by means of a tool.

The unlocking recess is preferably connected to the installation recess and enables a non-destructive pulling out or respectively levering out of the locking member by means of a tool, for example by means of a flat screwdriver or of another levering tool.

The locking member preferably has at least one latch lug and the connecting piece receiving section at least one installation latch recess, wherein the latch lug can be latched into place in the installation latch recess, in order to latch the locking member into place in an installation end position, wherein the latch lug is arranged externally relative to the installation direction of the locking member, and wherein the latch lug can be elastically displaced in a direction transverse to the installation direction of the locking member.

The latch lug is formed as a projection and preferably has a slope inclined to the installation direction, for better latching into place. The latch lug is preferably arranged, in installation direction, on the front end of the locking member. The installation latch recess can be formed as a depression, groove, pocket or slit in the connecting piece receiving section, in which the latch lug can snap into place. Latch lug and installation latch recess are preferably configured such that, in the installation end position, a force is always exerted between latch lug and installation latch recess in radial direction, which additionally prevents a radial displacing of the locking member in the connecting piece receiving section. In the installation end position the locking member shows its locking function, that is, in the installation end position the locking latch can engage with the locking projection. The locking member preferably has two latch lugs which are arranged on both sides externally relative to the installation direction of the locking member, wherein the connecting piece receiving section likewise has two installation latch recesses in this case.

In addition, the connecting piece receiving section preferably has an intermediate latch recess, in which the latch lug can be latched into place, in order to latch the locking member into place in an intermediate position, wherein, in the intermediate position, a locking of the connecting piece guided into the connecting piece receiving section is prevented.

The intermediate latch recess can likewise be formed as a depression, groove, pocket or slit in the connecting piece receiving section, in which the latch lug can snap into place. The intermediate latch recess is arranged higher up in installation direction relative to the installation latch recess. With the releaseable variant of the locking member, the installation end position can constitute a locking position and the intermediate position an unlocking position, wherein, in the unlocking position, the connecting piece can be pulled out of the connecting piece receiving section.

The locking member preferably has a sealing ring holding geometry, wherein the sealing ring holding geometry is configured to prevent a displacement of the sealing ring arranged in the connecting piece receiving section in the intermediate position of the locking member.

The sealing ring holding geometry is preferably formed on both sides of the straight sections of the U-shaped locking member and protrudes inward in a direction transverse to the axial direction. The sealing ring holding geometry can be formed such that, in the intermediate position of the locking member, it lies adjacent to the sealing ring.

In the following, embodiments of the present invention are described in greater detail by means of the accompanying figures. The fact that the present invention is not limited to these embodiments and that individual features of the embodiments can be freely combined to form additional embodiments, is to be understood.

DETAILED DESCRIPTION

Figure 1:
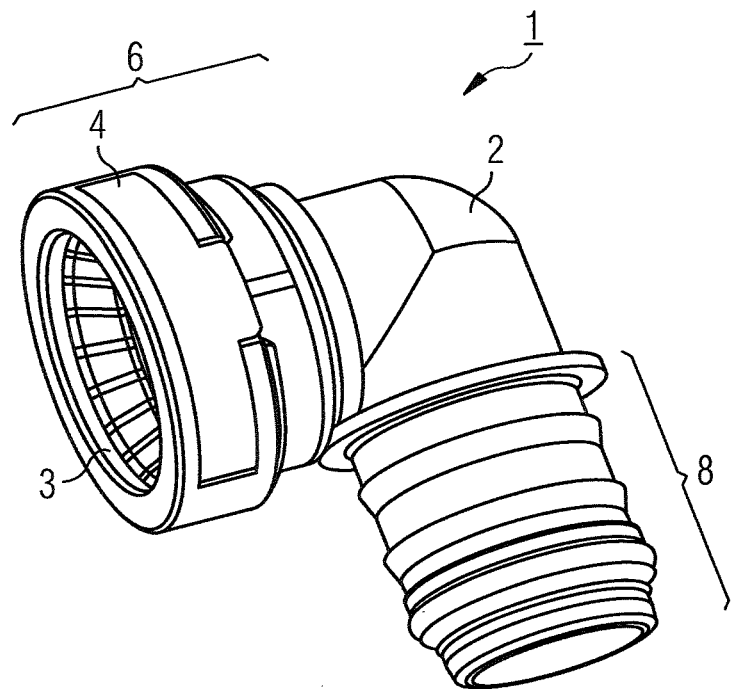
FIG. 1 shows a perspective view of a coupling device according to a first embodiment.

FIG. 1 shows a coupling device 1 according to a first embodiment in a perspective view. The coupling device has a coupling body 2 and a locking member 4. The coupling body is formed L-shaped and, on one end thereof, has a connecting piece receiving section 6 formed like a sleeve and, on the other end thereof, a conduit receiving section 8 formed like a spout. The connecting piece receiving section 6 has a connecting piece receiving opening 3 open in axial direction or respectively longitudinal direction of the connecting piece receiving section 6. In the state shown, the coupling body 2 is in the installation end position, and the locking member 4 is substantially arranged completely in the interior space of the connecting piece receiving section 6.

Figure 2:
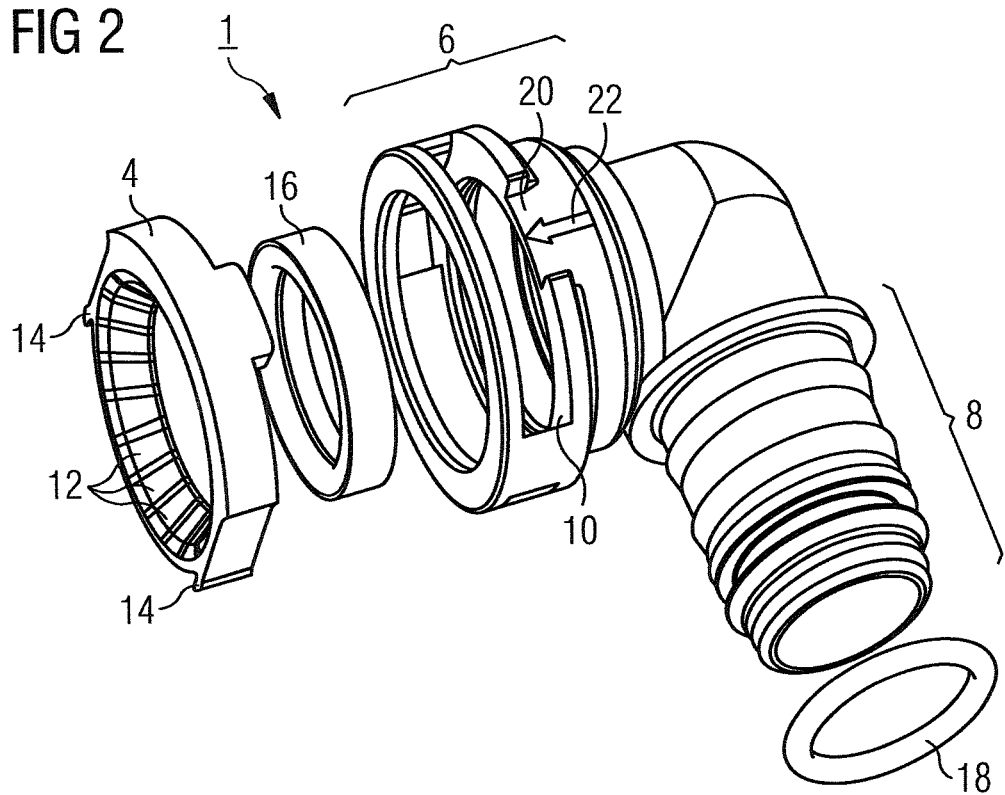
FIG. 2 shows an exploded diagram of the coupling device according to the first embodiment.

As can be seen in the exploded diagram in FIG. 2, the connecting piece receiving section 6 has an installation recess 10, via which the locking member 4 can be guided into the connecting piece receiving section 6 laterally. The locking member 4 of the coupling device 1 according to the first embodiment is formed substantially ring-shaped. A plurality of locking latches 12 are arranged next to each other along the whole ring-shaped inner circumference of the locking member 4, which serve to lock into place the connecting piece guided into the connecting piece receiving area 6. The locking member 4 has, on each in installation direction front end of the two lateral outer surfaces, latch lugs 14 extending in installation direction.

The coupling device 1 according to the first embodiment further has a connecting piece sealing ring 16 which is arranged in the connecting piece receiving section 6 and ensures the sealing between coupling device 1 and connecting piece. An additional conduit sealing ring 18 is arranged in a groove in the conduit receiving section 8 and ensures the sealing between coupling device 1 and conduit.

The connecting piece receiving section 6 further has unlocking recess 20 which is connected to the installation recess 10. The unlocking recess 20 is marked by an arrow-shaped unlocking marking 22.

Figure 3:
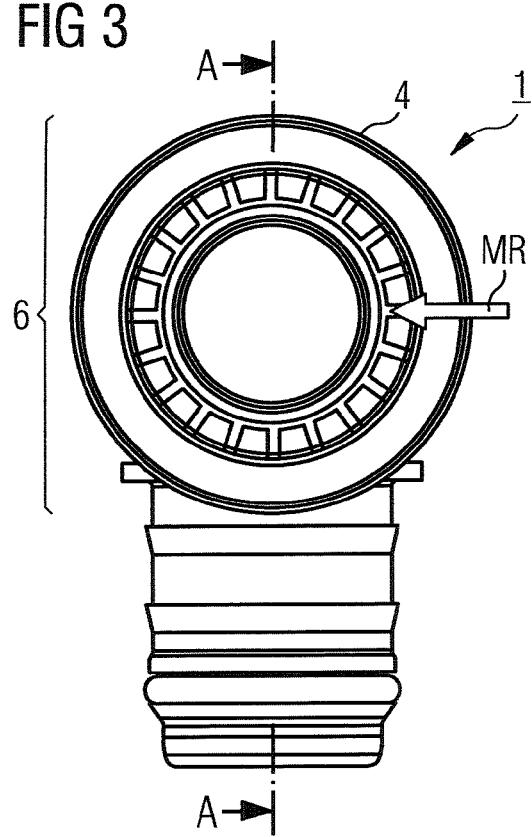
FIG. 3 shows the coupling device according to the first embodiment in a view from the front.
Figure 4:
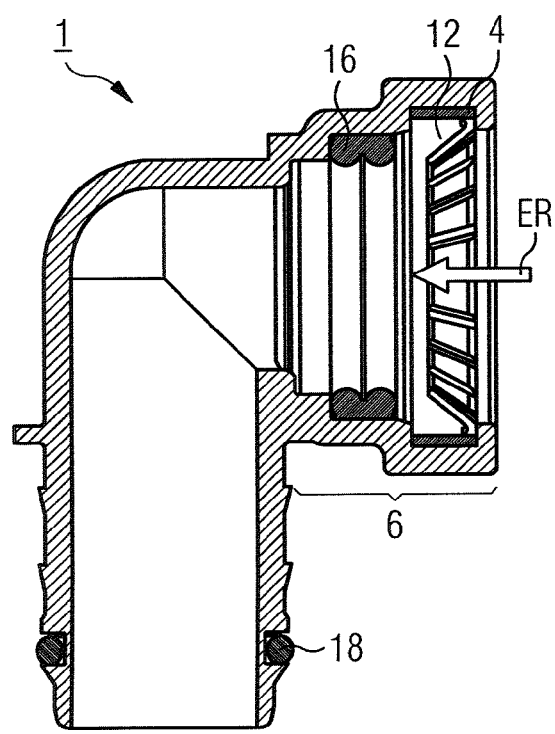
FIG. 4 shows a section view of the coupling device according to the first embodiment from the direction of view A in FIG. 3.

FIG. 3 shows the coupling device 1 according to the first embodiment in a view from the front, and FIG. 4 shows a section view of the coupling device 1 according to the first embodiment along the section A-A in FIG. 3. The direction specifications "front", "rear", "above", "below" and "side" with reference to the views in the figures are chosen arbitrarily and serve merely to differentiate between the various views. In particular, no reference to the installation direction of the locking member 4 or the guiding-in direction of the connecting piece is intended to be established.

In FIG. 3 the installation direction of the locking member 4 is indicated by the arrow MR. The installation direction MR runs in radial direction of the connecting piece receiving area 6. The guiding-in direction of the connecting piece is indicated by the arrow ER in FIG. 4. The guiding-in direction of the connecting piece ER runs in axial direction of the connecting piece receiving area 6. The locking latches 12 extend from the inner circumference of the locking member 4 diagonally radially inward, at an angle of about 45° relative to the guiding-in direction ER of the connecting piece or respectively relative to the longitudinal axis of the connecting piece receiving section 6.

Figure 5:
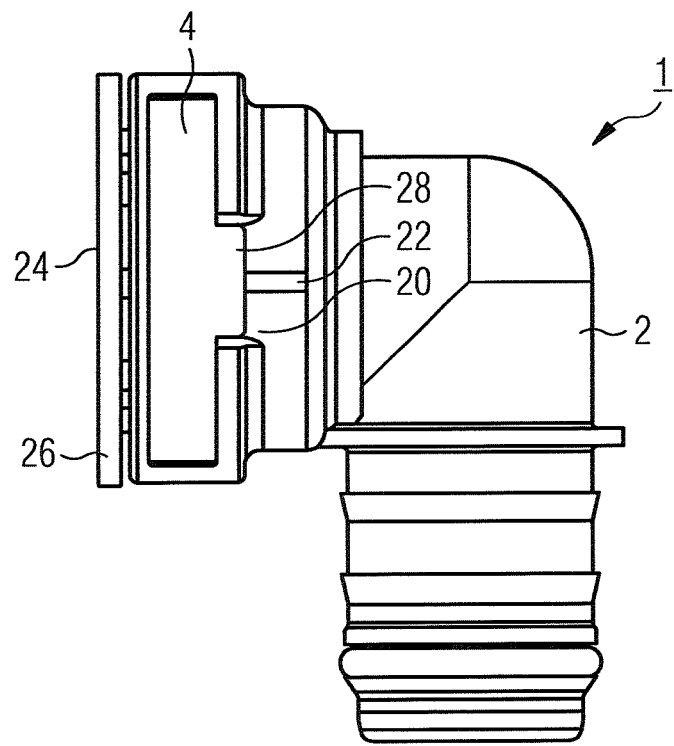
FIG. 5 shows the coupling device according to the first embodiment with guided-in connecting piece in a view from above.

FIG. 5 shows the coupling device 1 according to the first embodiment with guided-in connecting piece 24 in a view from above. In the figures the connecting piece 24 has a circular disk-shaped base 26 which, however, in fact constitutes a section of a crankcase or of a fuel tank. The locking member 4 of the coupling device 1 according to the first embodiment has a concealing projection 28 which, in the installation end position, is arranged in the unlocking recess 20 and conceals the unlocking marking 22. Thereby it can be seen by the user that this is an unreleaseable variant of the coupling device 1 or respectively of the locking member 4. It is further advantageous that the same coupling body 2 can be used for both an unreleaseable and a releaseable variant of the coupling device, merely by the locking member 4 being replaced, which will be described in greater detail later with reference to the second embodiment.

Figure 6:
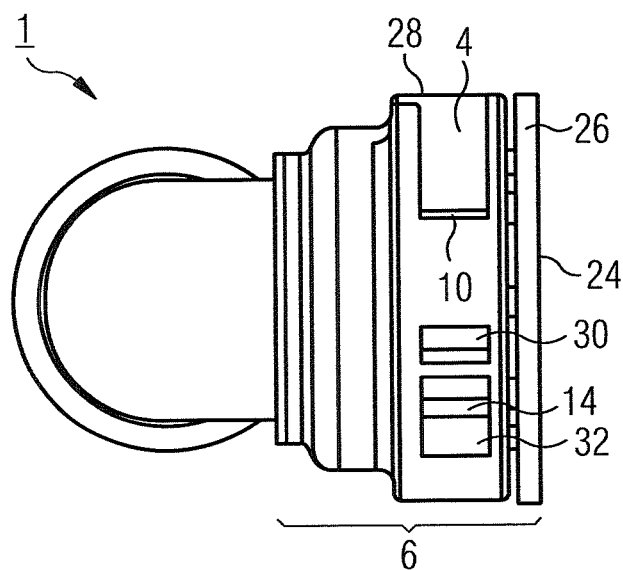
FIG. 6 shows the coupling device according to the first embodiment with guided-in connecting piece in a view from the side.

FIG. 6 shows the coupling device 1 according to the first embodiment with guided-in connecting piece 24 in a view from the side. The connecting piece receiving section 6 has, in installation direction spaced apart from the installation recess 10, two intermediate latch recesses 30 arranged opposite and, spaced further apart, two installation latch recesses 32 arranged opposite. In the installation end position of the locking member 4 the latch lugs 14 are arranged in the installation latch recesses 32 or respectively snapped into place in these. The connecting piece receiving section 6 is formed substantially symmetrical relative to a plane which runs in installation direction of the locking member 4 and contains the longitudinal axis of the connecting piece receiving section 6.

Figure 7:
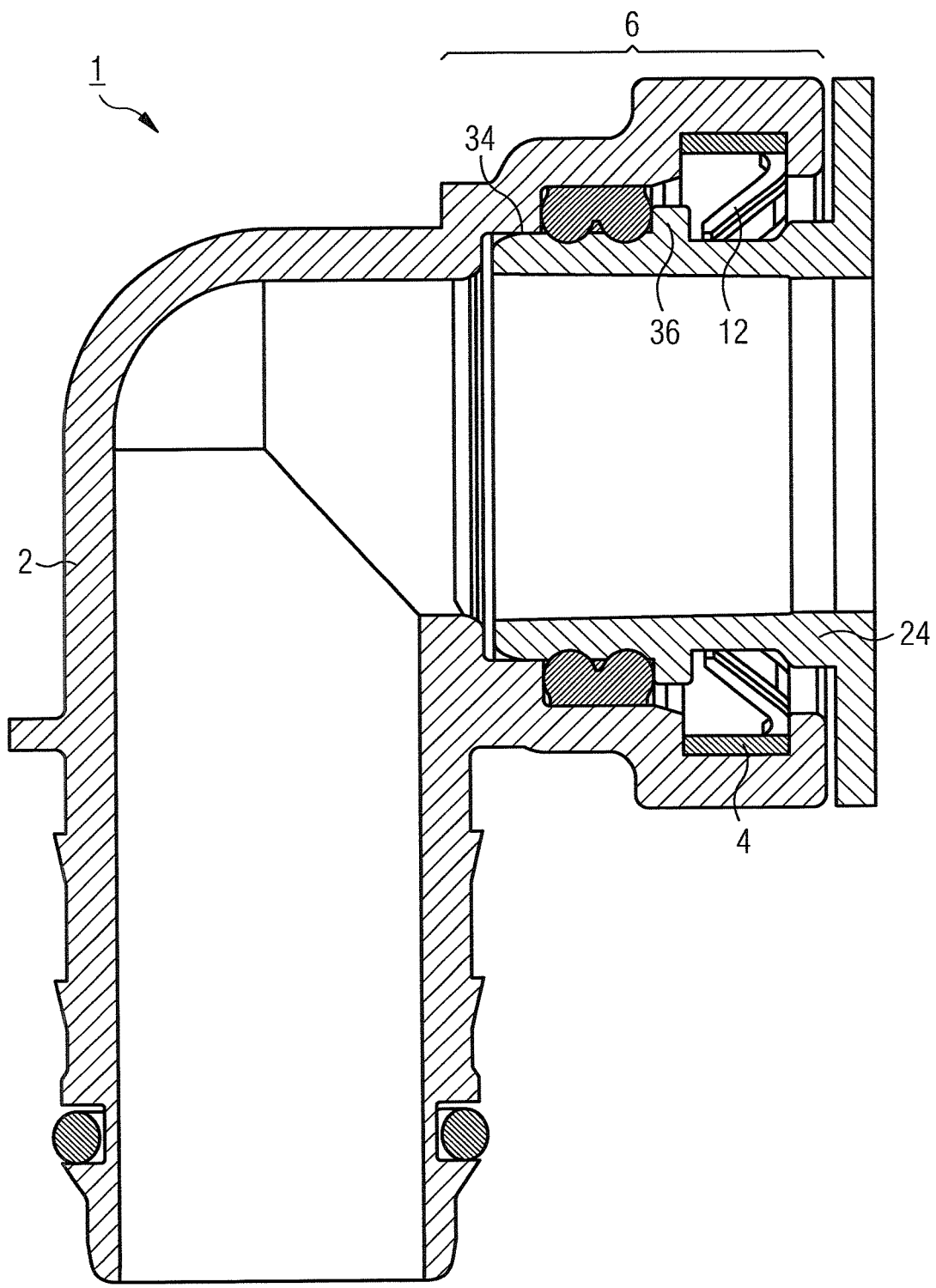
FIG. 7 shows a section view of the coupling device according to the first embodiment with guided-in connecting piece from the direction of view A in FIG. 3.

FIG. 7 shows a section view of the coupling device 1 according to the first embodiment with connecting piece 24 guided in from the direction of view A in FIG. 3. The connecting piece 24 is arranged in the connecting piece receiving section 6 of the coupling body 2, and is centered in the connecting piece receiving section 6 by means of the centering surface 34 of the connecting piece receiving section 6. During the guiding-in of the connecting piece 24, the locking latches 12 are first elastically displaced radially outward by means of the locking projection 36 which is formed circumferentially on the outer surface of the connecting piece 24. During the further guiding in of the connecting piece 24 the locking projection 36 passes the locking latches 12, so that the locking latches 12 spring back into the original position and in this way lock or respectively fasten the connecting piece 24 in the connecting piece receiving section 6. In this way the connecting piece 24 and the coupling device 1 are unreleaseably connected to each other, since both a non-destructive pulling out of the connecting piece 24 and a non-destructive pulling out of the locking member 4 are no longer possible.

Figure 8:
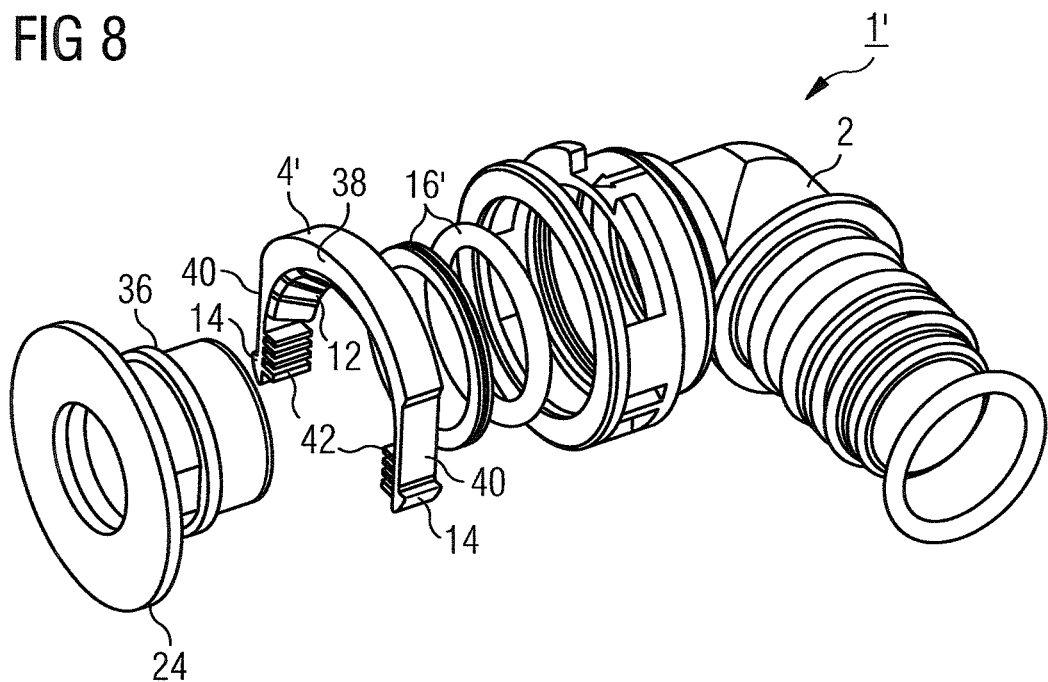
FIG. 8 shows an exploded diagram of a coupling device with connecting piece according to a second embodiment.

FIG. 8 shows an exploded diagram of a coupling device 1' with connecting piece 24 according to a second embodiment. The coupling body 2 is formed substantially the same as in the first embodiment. The second embodiment differs from the first embodiment in the configuration of the locking member 4'. A further insignificant difference to the first embodiment is that, in place of one connecting piece sealing ring 16, two separate connecting piece sealing rings 16' are arranged in the connecting piece receiving area 6, wherein one of the connecting piece sealing rings 16' constitutes a support ring.

The locking member 4' of the coupling device 1' according to the second embodiment is formed substantially U-shaped and has a substantially semicircular, curved section 38 and two straight sections 40 extending substantially in installation direction. The latch lugs 14 are formed on the ends of the straight sections 40. The ends of the straight sections 40 each further have a sealing ring holding geometry 42 on the inside, which protrudes inward transverse to the installation direction. A plurality of locking latches 12 are arranged next to each other along the whole inner circumference of the curved section 38 of the locking member 4'.

Figure 9:
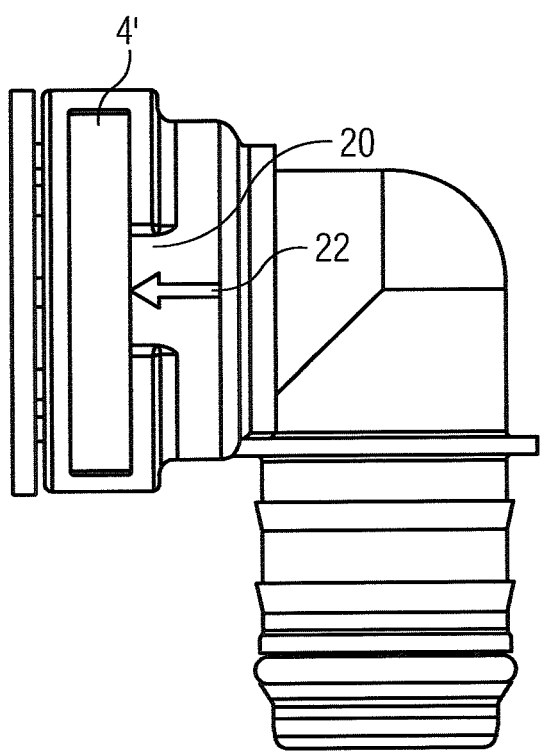
FIG. 9 shows the coupling device according to the second embodiment with guided-in connecting piece in a view from above.

As can be seen in FIG. 9, the locking member 4' does not have a concealing projection 28, unlike in the first embodiment. Therefore, both the unlocking recess 20 and the unlocking marking 22 are exposed in the installation end position of the locking member 4'. This enables the user to see that this is a releasable variant of the coupling device 1' or respectively of the locking member 4'.

Figure 10:
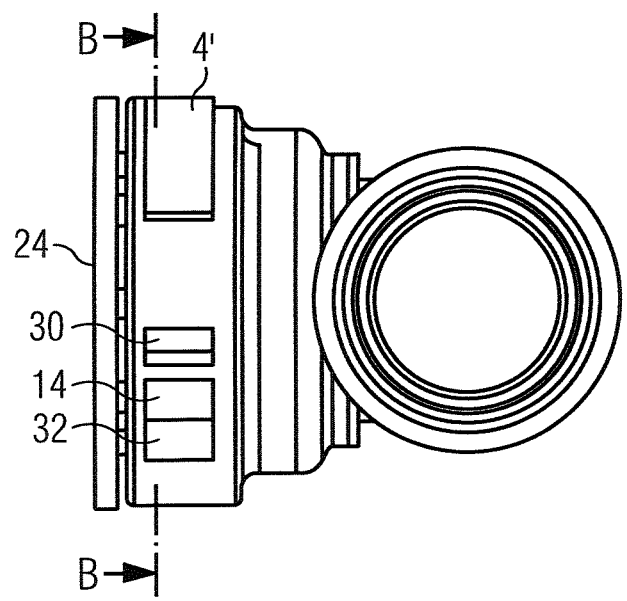
FIG. 10 shows the coupling device according to the second embodiment with guided-in connecting piece in a view from the side.
Figure 11:
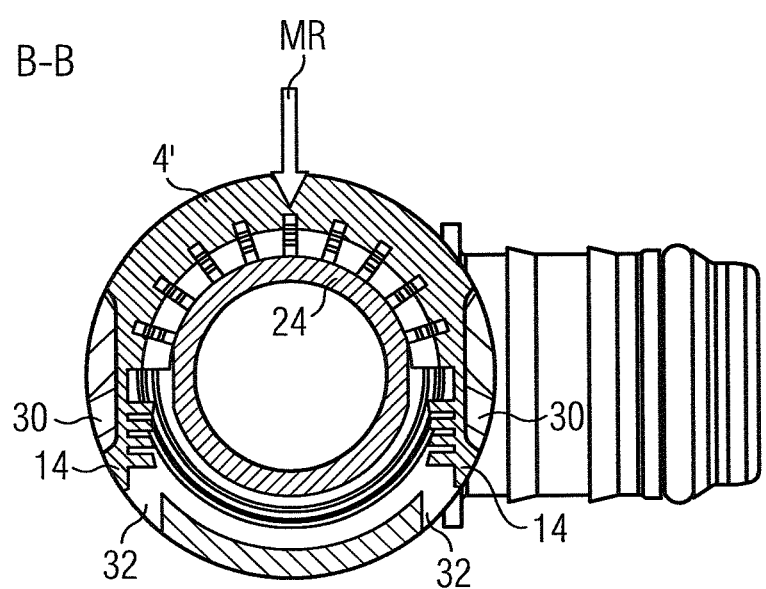
FIG. 11 shows a section view of the coupling device according to the second embodiment from the direction of view B in FIG. 10.

FIG. 11 shows a section view of the coupling device 1' according to the second embodiment from the direction of view B in FIG. 10. In the installation end position of the locking member 4' the latch lugs 14 are arranged in the corresponding installation latch recesses 32 or respectively snapped into place in these. Due to the U-shaped formation of the locking member 4', the locking member 4' can be displaced from the installation end position, counter to the installation direction MR, despite the guided-in connecting piece 24, whereby the connecting piece 24 can be unlocked.

Figure 12:
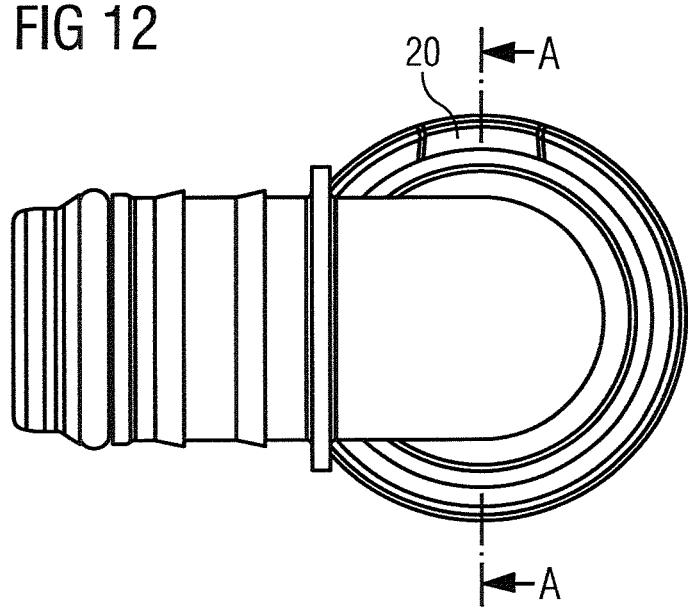
FIG. 12 shows the coupling device according to the second embodiment in a view from the rear.
Figure 13:
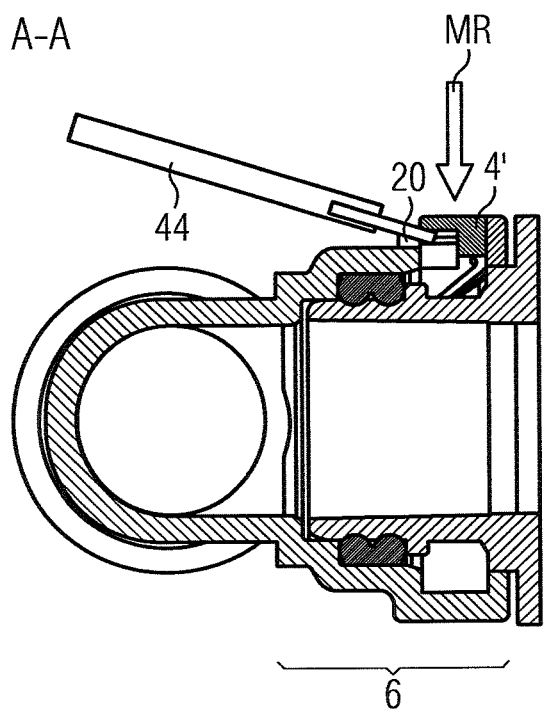
FIG. 13 shows a section view of the coupling device according to the second embodiment from the direction of view A in FIG. 12, wherein a tool for unlocking is guided into the unlocking recess.

FIG. 13 shows a section view of the coupling device 1' according to the second embodiment from the direction of view A in FIG. 12, wherein an unlocking tool 44 is guided into the unlocking recess 20. The tool 44 can be a flat screwdriver for example. The tool 44 can be shoved under an edge of the locking member 4' and turned for example, wherein the tool 44 is supported on the outer surface or respectively outer edge of the connecting piece receiving section 6 and lifts the locking member 4'. Doing this, the latching into place of the locking member 4' by means of the latch lugs 14 can be overcome and the locking member 4' displaced from the installation end position, counter to the installation direction.

Figure 14:
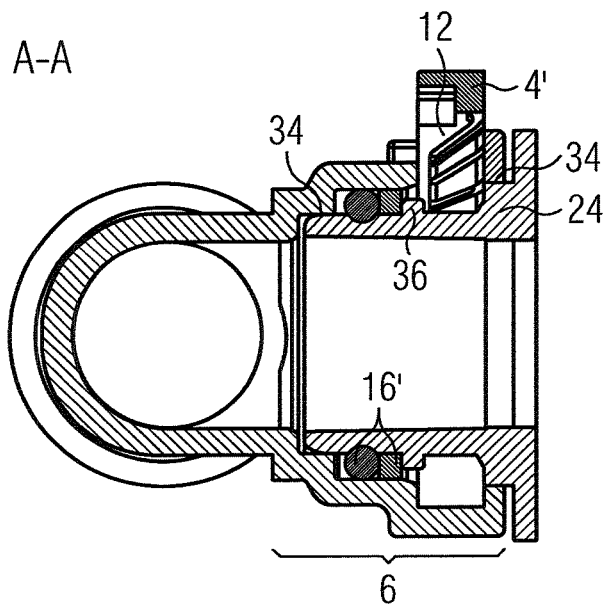
FIG. 14 shows a section view of the coupling device according to the second embodiment from the direction of view A in FIG. 12 in the unlocked state.
Figure 15:
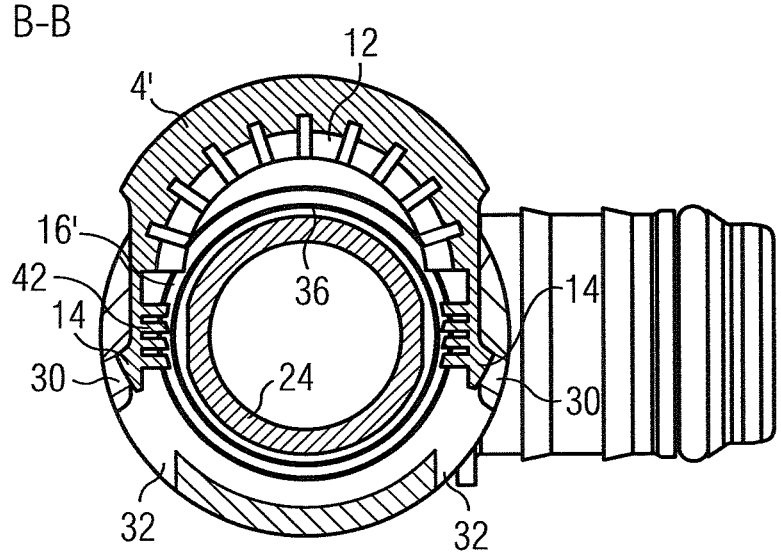
FIG. 15 shows a section view of the coupling device according to the second embodiment from the direction of view B in FIG. 10 in the unlocked state.

FIG. 14 shows a section view of the coupling device 1' according to the second embodiment from the direction of view A in FIG. 12 in the unlocked state, and FIG. 15 shows a section view of the coupling device 1' from the direction of view B in FIG. 10 in the unlocked state. In the state shown, the locking member 4' is latched into place in the intermediate position. Here the latch lugs 14 are arranged in the corresponding intermediate latch recesses 30 or respectively snapped into place in these, so that the locking member 4' is held in the intermediate position. In the intermediate position the locking latches 12 of the locking member 4' are spaced apart from the locking projection 36 such that the connecting piece 24 is unlocked and can be pulled out of the connecting piece receiving section 6. In the unlocked state the connecting piece 24 is furthermore centered by means of the centering surfaces 34 in the connecting piece receiving section 6. In the intermediate position of the locking member 4' the sealing ring holding geometries 42 are arranged such that they prevent the connecting piece sealing rings 16' being displaced from or respectively falling out of the connecting piece receiving section 6.

REFERENCE LIST

1; 1' Coupling device
2 Coupling body
3 Connecting piece receiving opening
4; 4' Locking member
6 Connecting piece receiving section
8 Conduit receiving section
10 Installation recess
12 Locking latch
14 Latch lug
16; 16' Connecting piece sealing ring
18 Conduit sealing ring
20 Unlocking recess
22 Unlocking marking
MR Installation direction of the locking member
ER Guiding-in direction of the connecting piece
24 Connecting piece
26 Base of the connecting piece
28 Concealing projection
30 Intermediate latch recess
32 Installation latch recess
34 Centering surface
36 Locking projection
38 Curved section
40 Straight section
42 Sealing ring holding geometry
44 Tool

What is claimed is:

1. Coupling device for conduits conveying hydrocarbon liquids and hydrocarbon vapors, comprising:
a coupling body with a connecting piece receiving section, and
a locking member for locking a connecting piece guided into the connecting piece receiving section;
wherein the connecting piece receiving section has an installation recess open radially toward a side thereof, and
wherein the locking member is adapted to be guided laterally in a radial direction into the connecting piece receiving section via the installation recess,
wherein the locking member has at least one latch lug and the connecting piece receiving section has at least one installation latch recess, wherein the latch lug is adapted to be latched into place in the installation latch recess, in order to lock the locking member into place in an installation end position, wherein the latch lug is arranged externally relative to an installation direction of the locking member, and wherein the latch lug is adapted to be elastically displaced in a direction transverse to the installation direction of the locking member,
wherein the connecting piece receiving section has, in addition, an intermediate latch recess in which the latch lug is adapted to be latched into place, in order to latch the locking member into place in an intermediate position, wherein, in the intermediate position, the locking member is positioned such that it cannot engage the connecting piece for locking and such that a locking into place of the connecting piece guided into the connecting piece receiving section is prevented,
wherein the locking member has a sealing ring holding geometry, wherein the sealing ring holding geometry is configured to prevent, in the intermediate position of the locking member, a displacing of a sealing ring arranged in the connecting piece receiving section.

2. Coupling device according to claim 1, wherein the connecting piece has a locking projection and the locking member has at least one elastically displaceable locking latch radially directed inward, which is adapted to be engaged with the locking projection of the connecting piece guided into the connecting piece receiving section.

3. Coupling device according to claim 1, wherein the locking member is formed substantially ring-shaped, and wherein the connecting piece guided into the connecting piece receiving section is adapted to be unreleaseably locked into place in the connecting piece receiving section via the locking member.

4. Coupling device according to claim 3, wherein a plurality of elastically displaceable locking latches radially directed inward are formed along a ring-shaped inner circumference of the locking member.

5. Coupling device according to claim 1, wherein the locking member is formed substantially U-shaped, and wherein the connecting piece guided into the connecting piece receiving section is adapted to be releaseably locked into place in the connecting piece receiving section via the locking member.

6. Coupling device according to claim 5, wherein a plurality of elastically displaceable locking latches radially directed inward are formed along an inner circumference of a section of the locking member, which is curved in the shape of a semicircle.

7. Coupling device according to claim 5, wherein the connecting piece receiving section has an unlocking recess, which enables the locking member installed in the connecting piece receiving section to be levered out by a tool.

8. Coupling device according to claim 1, wherein said coupling device is adapted to be used with at least one of the following:

crankcase ventilation conduits,
fuel conduits and
tank ventilation conduits.

\* \* \* \* \*